US009497699B2

(12) United States Patent
Patil et al.

(10) Patent No.: US 9,497,699 B2
(45) Date of Patent: Nov. 15, 2016

(54) DEDICATED CHANNEL FOR FAST INITIAL LINK SETUP IN A WIRELESS NETWORK

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/670,118

(22) Filed: Mar. 26, 2015

(65) Prior Publication Data

US 2015/0282063 A1    Oct. 1, 2015

Related U.S. Application Data

(60) Provisional application No. 61/972,851, filed on Mar. 31, 2014.

(51) Int. Cl.

| H04W 4/00 | (2009.01) |
|---|---|
| H04W 48/20 | (2009.01) |
| H04W 72/04 | (2009.01) |
| H04W 48/10 | (2009.01) |

(Continued)

(52) U.S. Cl.
CPC .............. *H04W 48/20* (2013.01); *H04W 48/10* (2013.01); *H04W 72/0433* (2013.01); *H04W 36/0061* (2013.01); *H04W 48/14* (2013.01); *H04W 76/02* (2013.01)

(58) Field of Classification Search
CPC ................ H04W 48/20; H04W 48/10; H04W 72/0433; H04W 76/02; H04W 48/14; H04W 36/0061

See application file for complete search history.

(56) References Cited

U.S. PATENT DOCUMENTS

| 8,570,898 B1 | 10/2013 | Kopikare et al. |
| 2013/0176897 A1* | 7/2013 | Wang .................... H04W 12/06 370/254 |

(Continued)

FOREIGN PATENT DOCUMENTS

| WO | 2013085366 A1 | 6/2013 | |
| WO | WO 2013085366 A1 * | 6/2013 | ............ H04W 76/02 |

(Continued)

OTHER PUBLICATIONS

International Search Report and Written Opinion—PCT/US2015/023072—ISA/EPO—Jul. 2, 2015.

(Continued)

*Primary Examiner* — Clemence Han
(74) *Attorney, Agent, or Firm* — Toler Law Group, PC

(57) ABSTRACT

An access point may advertise (e.g., broadcast) identifying information (e.g., a neighbor report and access point capability information) on a dedicated channel in a wireless network. The identifying information may include information about neighboring access points in the wireless network. The neighboring access points may operate on the dedicated channel, a different primary operating channel, or a combination thereof. A station entering the wireless network may scan the dedicated channel to detect the identifying information from the access point to aid relatively quick discovery of the neighboring access points without scanning multiple channels.

25 Claims, 5 Drawing Sheets

(51) Int. Cl.
  *H04W 36/00*  (2009.01)
  *H04W 48/14*  (2009.01)
  *H04W 76/02*  (2009.01)

(56) References Cited

U.S. PATENT DOCUMENTS

| | | | |
|---|---|---|---|
| 2013/0215757 A1 | 8/2013 | Vandwalle et al. | |
| 2013/0235852 A1* | 9/2013 | Segev | H04W 72/044 370/336 |
| 2013/0252548 A1* | 9/2013 | Levy | H04W 8/005 455/41.2 |
| 2013/0294232 A1* | 11/2013 | Segev | H04W 28/06 370/230 |
| 2014/0064128 A1* | 3/2014 | Park | H04W 48/12 370/252 |
| 2014/0112325 A1* | 4/2014 | Calcev | H04W 48/16 370/338 |
| 2014/0112327 A1* | 4/2014 | Calcev | H04W 48/14 370/338 |
| 2014/0329498 A1* | 11/2014 | Cherian | H04W 12/06 455/411 |
| 2014/0347985 A1* | 11/2014 | Yi | H04W 76/02 370/230 |
| 2015/0131641 A1* | 5/2015 | Ong | H04W 48/20 370/338 |
| 2015/0163723 A1* | 6/2015 | Pandey | H04W 16/10 370/252 |
| 2015/0208330 A1* | 7/2015 | Park | H04W 48/16 370/338 |
| 2015/0282064 A1 | 10/2015 | Patil et al. | |

FOREIGN PATENT DOCUMENTS

| | | |
|---|---|---|
| WO | 2013190168 A1 | 12/2013 |
| WO | 2014025216 A1 | 2/2014 |

OTHER PUBLICATIONS

International Search Report and Written Opinion—PCT/US2015/023064—ISA/EPO—Sep. 15, 2015.
Mano H., 802.11ai—Improving WLAN System Performance; doc.: IEEE 11-13-1325r4, Nov. 2013, pp. 1-26, [retrieved on Nov. 11, 2013] pp. 6,9.

* cited by examiner

DEDICATED CHANNEL FOR FAST INITIAL LINK SETUP IN A WIRELESS NETWORK

I. CLAIM OF PRIORITY

The present application claims priority from U.S. Provisional Patent Application No. 61/972,851 entitled "DEDICATED CHANNEL FOR FAST INITIAL LINK SETUP IN A WIRELESS NETWORK," filed Mar. 31, 2014, the contents of which are incorporated by reference in their entirety.

II. FIELD

The present disclosure is generally related to a dedicated channel for fast initial link setup in a wireless network.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

The Institute of Electrical and Electronics Engineers (IEEE) has promulgated various industry specifications related to wireless networking, many of which are designated with the "IEEE 802.11" name. Typically, before a specification is drafted, a study group and/or task group is formed to evaluate the interest and feasibility of a particular wireless technology. For example, the "ai" task group (referred to as TGai or IEEE 802.11ai) is related to fast initial link setup (FILS). The TGai proposes broadcasting neighborhood information using a reduced neighbor report (RNR) information element (IE) that can be transmitted by access points in a beacon, a probe response, or a FILS discovery frame. Once a station (e.g., wireless telephone or other wireless device) receives an RNR IE, the station may use information in the RNR IE to establish a link with a "preferred" access point.

In order to receive nearby access point capability information (via an RNR IE) from an 802.11ai access point in an IEEE 802.11 network, a station entering the IEEE 802.11 network may scan a randomly selected channel for the RNR IE or broadcast a probe request via the randomly selected channel to receive a probe response that includes the RNR IE. However, if an 802.11ai access point is not operating on the randomly selected channel, the station may have to scan (or broadcast another probe request on) another channel to receive the RNR IE. Scanning multiple channels for an RNR IE may increase the amount of time for establishing the link with the preferred access point. For example, dual band access points in an IEEE 802.11 network may operate in a 2.4 Giga-Hertz (GHz) frequency band and a 5 GHz frequency band. The 2.4 GHz frequency band may include 11 channels, and the 5 GHz frequency band may include 12 channels. Thus, in some instances, the station may scan up to 23 channels prior to receiving an RNR IE from an 802.11ai access point in the IEEE 802.11 network. Scanning and/or probing multiple channels increases an initial link setup time.

IV. SUMMARY

The present disclosure presents techniques and protocols that enable a mobile device to scan a dedicated channel to obtain a neighbor report (e.g., a reduced neighbor report) from an access point, such as an Institute of Electrical and Electronics Engineers (IEEE) 802.11ai compliant access point. For example, the mobile device may scan a fast initial setup link (FILS) channel for a FILS frame (e.g., a beacon frame, a FILS discovery frame, and/or a probe response frame) that includes a reduced neighbor report transmitted by an IEEE 802.11ai access point.

To illustrate, upon entering an IEEE 802.11 wireless network, a mobile device may scan (e.g., tune to) a defined FILS channel to detect the presence of an IEEE 802.11ai access point. For example, the FILS channel may be a predetermined channel in which IEEE 802.11ai access points transmit (e.g., broadcast) reduced neighbor reports (e.g., a report that includes a list of nearby access points). The reduced neighbor reports may be transmitted via beacons, probe response frames and/or FILS discovery frames. In response to detecting a reduced neighbor report, the mobile station may obtain information about a "preferred" access point. The preferred access point may be an access point provided by a wireless service provider of the mobile device or an access point of a wireless network that is preferred by the user of the mobile device. The mobile device may obtain information regarding the operating class of the preferred access point, the primary operating channel of the preferred access point, the basic service set identification (BSSID) of the preferred access point, the target beacon transmission time (TBTT) of the preferred access point, etc. The mobile device may use the obtained information to perform an authentication routine (or handshake) with the preferred access point (e.g., to establish a communication link with the preferred access point). In addition, or in the alternative, the mobile device may broadcast a probe request on the FILS channel after scanning the FILS channel for a particular amount of time (e.g., approximately 5 milliseconds (ms)) without detecting a frame (e.g., beacon, FILS discovery or broadcast probe response frame) containing a reduced neighbor report. An IEEE 802.11ai access point may transmit a probe response that includes a reduced neighbor report to the mobile device in response to detecting the probe request on the FILS channel.

According to techniques and protocols of the present disclosure, at least one IEEE 802.11ai access point may maintain a "light" association with the FILS channel to receive probe requests, generate FILS frames that include reduced neighbor reports, and/or transmit the FILS frames to the mobile device via the FILS channel. To illustrate, IEEE 802.11ai access points may be dual-band (e.g., dual radio) access points having primary radios configured to perform standard access point operations and a secondary radio (e.g., a FILS radio) that is "lightly loaded" and configured to provide information (e.g., reduced neighbor reports) to IEEE 802.11ai stations (e.g., mobile devices) accessing the IEEE 802.11 network.

Alternatively, at least one IEEE 802.11ai access point may tune out a primary operating channel if the FILS channel is different from the primary operating channel to receive the probe request, generate a probe response, and transmit the probe response to the mobile device via the FILS channel. To illustrate, IEEE 802.11ai access points may be single-band access points that issue self clear-to-send (CTS) packets to block traffic on the primary operating channel. The single-band access points may tune to the FILS channel to receive the probe requests, generate FILS frames that include reduced neighbor reports, and/or transmit the FILS frames to the mobile device via the FILS channel.

The IEEE 802.11ai access points may utilize a coordination scheme to reduce traffic on the FILS channel. For example, prior to transmitting (e.g., broadcasting) a FILS frame, an IEEE 802.11ai access point may "listen on" the FILS channel for a relatively short amount of time (e.g., 5 ms) to detect FILS frames from other access points. The IEEE 802.11ai access point may suppress transmission of the FILS frame if at least one of two criteria has been satisfied. First, the IEEE 802.11ai access point may suppress transmission of the FILS frame if at least one other access point has broadcasted a FILS frame at a short range. For example, if the IEEE 802.11ai access point detects a FILS frame on the FILS channel having a relatively high received signal strength indicator (RSSI), the IEEE 802.11ai access point may suppress transmission of the FILS frame because the coverage area of the other access point is most likely similar to the coverage area of the IEEE 802.11ai access point. Secondly, the IEEE 802.11ai access point may suppress transmission of the FILS frame if three other access points have broadcasted a FILS frame at a medium range (e.g., mid-range RSSIs) on the FILS channel. Three access points broadcasting FILS frames at medium range may imply that the IEEE 802.11ai access point is approximately within a triangle formed by the three access points such that the coverage area of the three access points, collectively, is similar to the coverage area of the IEEE 802.11ai access point. However, if either criteria is satisfied and the IEEE 802.11ai access point determines that the reduced neighbor reports in the FILS frames broadcasted on the FILS channel do not list all of the neighboring access points in the reduced neighbor report of the IEEE 802.11ai access point, the IEEE 802.11 access point may override transmission suppression and broadcast the FILS frame on the FILS channel.

According to one example of the techniques described herein, a method includes generating identifying information at an access point and broadcasting the identifying information via a dedicated channel in a wireless network. The identifying information includes a neighbor report (e.g., a reduced neighbor report), access point capability information (e.g., access point security information associated with the access point and higher layer capability information indicating higher layer capabilities of the access point), or a combination thereof. The access point capability information is carried in a fast initial link setup (FILS) indication element according to an Institute of Electrical and Electronics Engineers (IEEE) 802.11ai protocol.

According to another example of the techniques described herein, an apparatus includes a processor and a memory coupled to the processor. The memory stores instructions that are executable by the processor to perform operations. The operations include generating identifying information at an access point and broadcasting the identifying information via a dedicated channel in a wireless network. The identifying information includes a neighbor report (e.g., a reduced neighbor report), access point capability information (e.g., access point security information associated with the access point and higher layer capability information indicating higher layer capabilities of the access point), or a combination thereof. The access point capability information is carried in a fast initial link setup (FILS) indication element according to an Institute of Electrical and Electronics Engineers (IEEE) 802.11ai protocol.

According to another example of the techniques described herein, a non-transitory computer-readable medium includes instructions that, when executed by a processor, cause the processor to generate identifying information at an access point and initiate a broadcast of the identifying information via a dedicated channel in a wireless network. The identifying information includes a neighbor report (e.g., a reduced neighbor report), access point capability information (e.g., access point security information associated with the access point and higher layer capability information indicating higher layer capabilities of the access point), or a combination thereof. The access point capability information is carried in a fast initial link setup (FILS) indication element according to an Institute of Electrical and Electronics Engineers (IEEE) 802.11ai protocol.

According to another example of the techniques described herein, an apparatus includes means for determining a signal strength of at least one broadcasted neighbor report on a dedicated channel in a wireless network and means for broadcasting identifying information via the dedicated channel in response to a determination that the signal strength fails to satisfy a threshold. The identifying information includes a neighbor report (e.g., a reduced neighbor report), access point capability information (e.g., access point security information associated with the access point and higher layer capability information indicating higher layer capabilities of the access point), or a combination thereof. The access point capability information is carried in a fast initial link setup (FILS) indication element according to an Institute of Electrical and Electronics Engineers (IEEE) 802.11ai protocol.

According to another example of the techniques described herein, a method includes scanning, at a first station, a dedicated channel in a wireless network to detect broadcasted information from an access point in the wireless network. The method also includes obtaining identifying information regarding a particular identifiable access point from the broadcasted information. The broadcasted information includes a neighbor report (e.g., a reduced neighbor report), access point capability information (e.g., access point security information associated with the particular identifiable access point and higher layer capability information indicating higher layer capabilities of the particular identifiable access point), or a combination thereof. The access point capability information is carried in a fast initial link setup (FILS) indication element according to an Institute of Electrical and Electronics Engineers (IEEE) 802.11ai protocol.

According to another example of the techniques described herein, an apparatus includes a processor and a memory coupled to the processor. The memory stores instructions that are executable by the processor to perform operations. The operations include scanning, at a first station, a dedicated channel in a wireless network to detect broadcasted information from an access point in the wireless network. The operations also include obtaining identifying information regarding a particular identifiable access point from the broadcasted information. The broadcasted information includes a neighbor report (e.g., a reduced neighbor report), access point capability information (e.g., access point security information associated with the particular identifiable access point and higher layer capability information indicating higher layer capabilities of the particular identifiable access point), or a combination thereof. The access point capability information is carried in a fast initial link setup (FILS) indication element according to an Institute of Electrical and Electronics Engineers (IEEE) 802.11ai protocol.

According to another example of the techniques described herein, a non-transitory computer-readable medium includes instructions that, when executed by a processor, cause the processor to initiate, at a first station, a scan of a dedicated channel in a wireless network to detect broadcasted information from an access point in the wireless network. The instructions are also executable to cause the processor to obtain identifying information regarding a particular identifiable access point from the broadcasted information. The broadcasted information includes a neighbor report (e.g., a reduced neighbor report), access point capability information (e.g., access point security information associated with the particular identifiable access point and higher layer capability information indicating higher layer capabilities of the particular identifiable access point), or a combination thereof. The access point capability information is carried in a fast initial link setup (FILS) indication element according to an Institute of Electrical and Electronics Engineers (IEEE) 802.11ai protocol.

According to another example of the techniques described herein, an apparatus includes means for scanning a dedicated channel in a wireless network to detect broadcasted information from an access point in the wireless network. The apparatus also includes means for obtaining identifying information regarding a particular identifiable access point from the broadcasted information. The broadcasted information includes a neighbor report (e.g., a reduced neighbor report), access point capability information (e.g., access point security information associated with the particular identifiable access point and higher layer capability information indicating higher layer capabilities of the particular identifiable access point), or a combination thereof. The access point capability information is carried in a fast initial link setup (FILS) indication element according to an Institute of Electrical and Electronics Engineers (IEEE) 802.11ai protocol.

One advantage provided by at least one of the disclosed aspects is a reduction in initial scan for a station (e.g., a mobile device) to find a preferred access point of the station. For example, the station may obtain information (e.g., a reduced neighbor report) about the preferred access point by scanning and/or probing a dedicated channel as opposed to selectively scanning/probing random channels that may or may not have information about the preferred access point. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
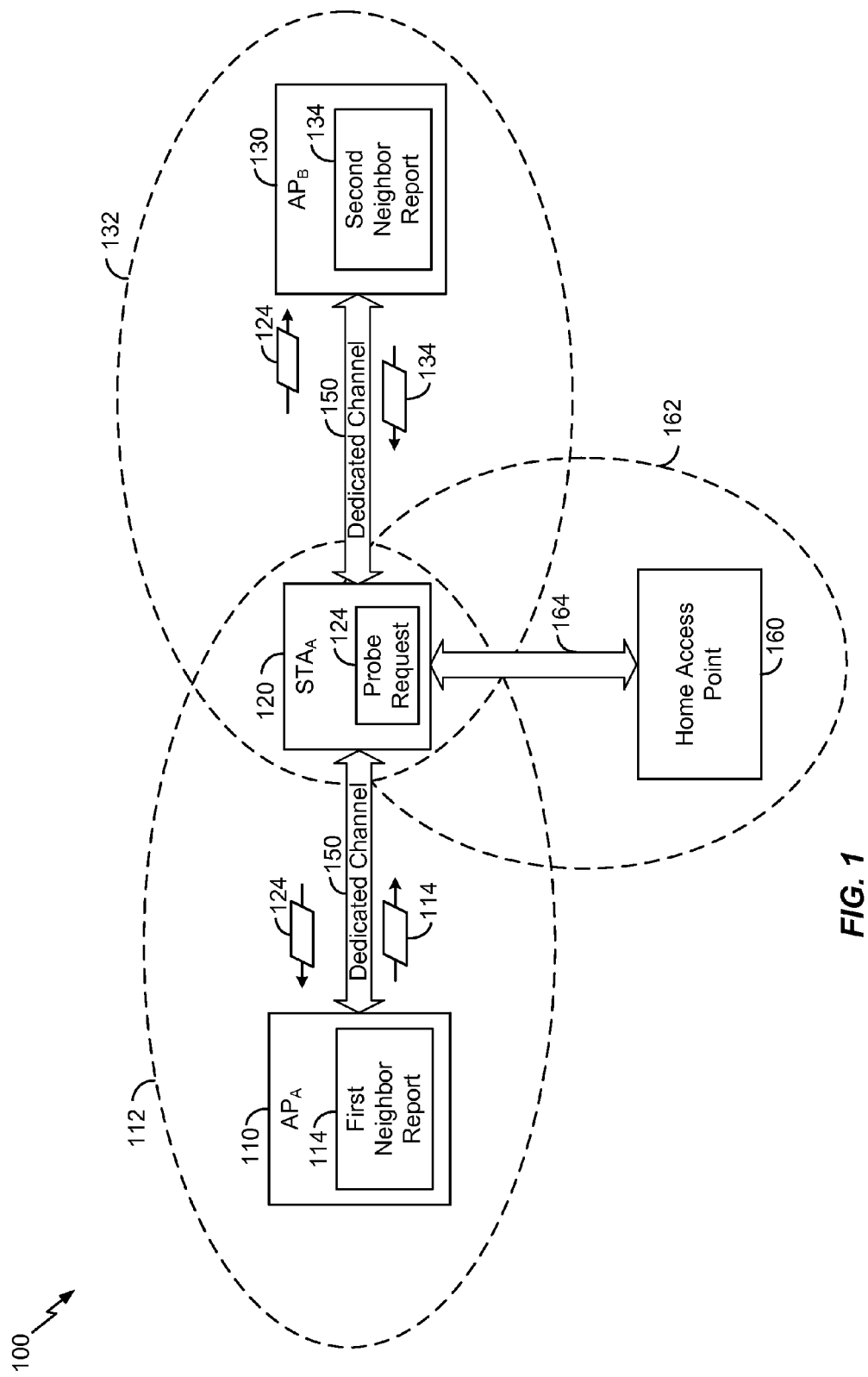
FIG. 1 is a diagram of a system that is operable to enable fast initial link setup via a dedicated channel.

Particular techniques of the present disclosure are described with reference to the drawings. In the description, common features are designated by common reference numbers throughout the drawings.

Institute of Electrical and Electronics Engineers (IEEE) 802.11 task group (TG) ai (hereinafter "TGai") is a task group involved in the study of fast initial link setup (FILS). In accordance with TGai submission(s), a neighbor report, such as a reduced neighbor report (RNR) information element (IE) may be included in a beacon response, a probe response, or a FILS discovery frame. For example, an access point may provide an RNR IE to a mobile device (e.g., a mobile station (STA)) that is not associated with the access point. The RNR IE may identify or reference one or more access points neighboring (e.g., surrounding) the access point and may aid the unassociated mobile device to find a "preferred" access point (e.g., an access point provided by a particular wireless service provider). For each access point identified in an RNR IE, the RNR IE may include information that identifies a channel (e.g., an operating channel) of the access point and a target beacon transmission time (TBTT) for the access point. The TBTT may be represented as an offset from a time associated with the RNR IE. Thus, a mobile device may be able to identify a particular (e.g., preferred) access point based on the information in the RNR IE.

Moreover, the mobile device may determine the operating channel and target beacon transmission time of the access point from the RNR IE, and the mobile device may therefore be able to receive a beacon from the access point, and initiate an authentication/association process with the access point without having to scan multiple channels and without having to scan for an extended period of time. The mobile device may also be able to gather additional capability information regarding the access point via FILS field(s) included in the beacon. The mobile device may use the operating channel information in the RNR IE to send a probe request to the particular (e.g., preferred) access point to solicit a probe response. The probe response may include additional capability information (e.g., in one or more FILS fields) regarding the access point. A FILS Indication IE (included in a beacon, a FILS discovery frame, and/or a probe response frame) may also include additional information regarding access points, such as a subnet identifier (ID), security information, etc. Accordingly, the RNR IE and the FILS Indication IE may enable the mobile device to quickly select an available access point to associate with while reducing a scan time and/or a probing overhead. The RNR IE may include a service set identifier (SSID). For example, a SSID may be more advantageous than a basic service set identifier (BSSID) to stations that have never associated with an access point previously. For example, the SSID may be more useful because different access points in the same extended service set identification (ESSID) may have the same SSID.

The disclosed systems, devices, and methods may enable a mobile device to receive an RNR IE via a dedicated channel to reduce a scan time and/or probing overhead. For example, each access point in a wireless network (e.g., an IEEE 802.11 wireless network) may transmit (e.g., broadcast) beacons, probe responses, and FILS discovery frames on the dedicated channel. A station within the wireless network may tune to the dedicated channel to receive an RNR IE from a beacon, probe response, or FILS discovery frame. Based on the received RNR IE, the station may find its preferred access point in the wireless network.

Referring to FIG. 1, a system 100 that is operable to enable fast initial link setup via a dedicated channel is shown. The system 100 includes a first access point (AP) 110, designated $AP_A$ in FIG. 1, a mobile device 120 (alternately referred to herein as a station (STA) and designated $STA_A$ in FIG. 1), and a second access point 130 (designated $AP_B$). It should be noted that additional (or fewer) access points may be present in the system 100. For example, as described below, the system 100 also includes a home access point 160. Additionally, it should be noted that although FIG. 1 depicts a single mobile device 120, any number of mobile devices may be present in the system 100. The first access point 110, the mobile device 120, and the second access point 130 may operate in compliance with one or more IEEE 802.11 standards, such as 802.11ai, as an illustrative, non-limiting example.

The mobile device 120 may be an electronic device that is operable to send and receive data via a wireless network. For example, the mobile device 120 may be a wireless phone, a personal digital assistant (PDA), a portable computing device, a tablet computing device, a portable media player, or a combination thereof. The mobile device 120 may be configured to perform an authentication routine, such as a handshake and key exchange routine, with one or more access points. For example, the mobile device 120 may perform an authentication routine with the first access point 110 to establish an authenticated session (e.g., an associated session) with the first access point 110. For example, the authenticated session may enable secure (e.g., encrypted) communication between the mobile device 120 and the access point 110. When the mobile device 120 communicates with the first access point 110 during an associated session, the mobile device 120 is considered to be configured in an associated state with the first access point 110. When the mobile device 120 is not in an associated session with a particular access point, the mobile device is considered to be configured in an unassociated state (e.g., a pre-associated state) with the particular access point. When the mobile device 120 is in the unassociated state with a particular access point, the mobile device 120 and the particular access point may communicate using unsecured messages, such as probe response messages, beacons, FILS discovery frames, or control messages.

Each of the access points 110, 130 may be a node of a wireless network. For example, each of the access points 110, 130 may be an IEEE 802.11 access point that supports (e.g., manages) a corresponding wireless data network. For example, the first access point 110 may support a first network 112 and the second access point 130 may support a second network 132. Each of the access points 110, 130 may include (e.g., store) a corresponding neighbor report. A particular neighbor report of a particular access point may identify neighboring (e.g., surrounding) access points in relation to the particular access point. For example, the first access point 110 may include (e.g., store) a first neighbor report 114 that identifies neighboring access points of the first access point 110, and the second access point 130 may include (e.g., store) a second neighbor report 134 that identifies neighboring access points of the second access point 130.

The first access point 110 may generate first identifying information (e.g., the first neighbor report 114, first access point capability information, or a combination thereof) and the second access point 130 may generate second identifying information (e.g., the second neighbor report 134, second access point capability information, or a combination thereof). Thus, the techniques described herein support generating identifying information at an access point. The identifying information includes a neighbor report, access point capability information, or a combination thereof. In one example, the neighbor report includes a reduced neighbor report according to the IEEE 802.11ai protocol. In one example, the access point capability information includes access point security information associated with the access point and higher layer capability information indicating higher layer capabilities of the access point. To illustrate, the access point security information may include information associated with "built in" access point encryption schemes (e.g., Wi-Fi Protected Access (WPA), Wi-Fi Protected Access II (WPA2)). The higher layer capability information may indicate an access point's ability to process higher protocol layers in IEEE 802.11 data packets.

For each neighboring access point identified or referenced in a neighbor report, such as the first neighbor report 114 or the second neighbor report 134, the neighbor report may also identify an operating channel of the neighboring access point, a media access control (MAC) address of the neighboring access point, a signal strength (e.g., a received signal strength indication (RSSI)) of the neighboring access point, one or more other parameters related to the neighboring access point, or a combination thereof, as illustrative, non-limiting examples. For example, the first neighbor report 114 and/or the second neighbor report 134 may include or correspond to a reduced neighbor report (RNR) compliant with 802.11ai, such as an RNR that includes one or more information elements (IEs) defined by the IEEE 802.11ai standard. The first neighbor report 114 and/or the second neighbor report 134 may include information regarding neighboring access points. For example, the neighbor reports 114, 134 may include information regarding operating classes of neighboring access points, primary operating channels of neighboring access points, target beacon transmission times (TBTTs) of neighboring access points, and basic service set identifications (BBSIDs) of neighboring access points.

During operation, the mobile device 120 may enter within transmission range of the first network 112 of the first access point 110 and/or the second network 132 of the second access point 130. The first access point 110 may be configured to broadcast identifying information (e.g., the first neighbor report 114 and/or first access point capability information) to stations (e.g., the mobile device 120) and other access points within transmission range of the first network 112 via a dedicated channel 150. Thus, the techniques described herein support broadcasting the identifying information via a dedicated channel in a wireless network. The first access point capability information may include first access point security information associated with the first access point 110 and higher layer capability information indicating higher layer capabilities of the first access point 110. In one example, the access point capability information is carried in a fast initial link setup (FILS) indication element according to an Institute of Electrical and Electronics (IEEE) 802.11ai protocol.

The dedicated channel 150 is a common channel shared by multiple access points to broadcast RNRs. Although one dedicated channel 150 is depicted in FIG. 1, the dedicated channel 150 may be a particular channel in a list (e.g., set) of dedicated channels. As a non-limiting example, the list of dedicated channels may include three non-overlapping channels in a 2.4 GHz frequency band. Thus, the dedicated channel 150 comprises a particular channel in a set of non-overlapping channels. The first access point 110 may broadcast a beacon frame that includes the identifying information (e.g., the first neighbor report 114 and/or the first access point capability information) via the dedicated channel 150. For example, the first access point 110 may broadcast a beacon frame approximately once every 100 milliseconds (ms). Beacon transmissions on the dedicated channel 150 may be synchronized to a global time source to reduce power drain during scanning operations at the mobile device 120, as described below. For example, beacon transmissions on the dedicated channel 150 may be synchronized to a global positioning system (GPS) or to cellular time. Alternatively, or in addition, the first access point 110 may broadcast a FILS discovery frame that includes the information (e.g., the first neighbor report 114 and/or the first access point capability information) via the dedicated channel 150. For example, the first access point 110 may broadcast a FILS discovery frame approximately once every 20 ms. As explained below, the first access point 110 may also broadcast a probe response frame that includes the first neighbor report 114 in response to receiving a probe request 124 from the mobile device 120. The first access point capability information may be carried in a FILS Indication element according to an IEEE 802.11ai protocol.

In a similar manner, the second access point 130 may be configured to broadcast information (e.g., the second neighbor report 134 and/or second access point capability information) to stations (e.g., the mobile device 120) and other access points within transmission range of the second network 132 via the dedicated channel 150. The second access point capability information may include security information associated with the second access point 130 and information indicating higher layer capabilities of the second access point 130). The second access point 130 may broadcast a beacon frame (e.g., approximately once every 100 ms) that includes the information (e.g., the second neighbor report 134 and/or the second access point capability information) via the dedicated channel 150. Alternatively, or in addition, the second access point 130 may broadcast a FILS discovery frame (e.g., approximately once every 20 ms) that includes the second neighbor report 134 via the dedicated channel 150. As explained below, the second access point 130 may also broadcast a probe response frame that includes the second neighbor report 134 in response to receiving the probe request 124 from the mobile device 120. The second access point capability information may be carried in a FILS Indication element according to an IEEE 802.11ai protocol.

FILS discovery frames transmitted from the access points 110, 130 may enable relatively quick access point discovery. For example, FILS discovery frames may include a service set identification (SSID) number, an access point configuration change count, the transmitting access point's next TBTT, a neighboring access point's next TBTT, an RNR (e.g., the first neighbor report 114 and/or the second neighbor report 134), access point capability (e.g., operating channel bandwidth, supported data rates, etc.), security/internet protocol (IP) address type capabilities, etc. Transmitting FILS discovery frames on the dedicated channel 150 may increase data throughput on primary operating channels of the access points 110, 130. For example, transmitting FILS discovery frames on the dedicated channel 150 (as opposed to the primary operating channels) may enable additional data frames to be transmitted on the primary operating channels.

The FILS discovery frames transmitted on the dedicated channel 150 may also include information corresponding to the transmitting access point's primary operating channel. The FILS discovery frames may include a subset of information in a standard 802.11ai FILS discovery frame to enable quick access point discovery. For example, in some scenarios, the access point capability, SSIDs, and the access point configuration change count may be omitted from the FILS discovery frames such that the mobile device 120 may process information at a faster rate. Additionally, the FILS discovery frames may be transmitted at a relatively high data rate to reduce congestion (e.g., "air occupancy") on the dedicated channel 150.

The access points 110, 130 may be IEEE 802.11ai access points. For example, the neighbor reports 114, 134 generated by the access points 110, 130 may be in compliance (e.g., include information in compliance) with the IEEE 802.11ai standard. The access points 110, 130 may be dual-band access points or single-band access points. A dual-band access point may have a first operating frequency channel in a first frequency band (e.g., a 5 Giga-Hertz (GHz) frequency band) and a second operating frequency channel in a second frequency band (e.g., a 2.4 GHz frequency band). A single-band access point may have an operating frequency channel in the second frequency band. The second frequency band may include 11 channels, and the first frequency band may include 12 channels. Thus, the dedicated channel 150 may be a channel within the second frequency band such that single-band access points and dual-band access points may broadcast on the dedicated channel 150. The dedicated channel 150 may be the sixth channel (e.g., channel 6) of the second frequency band. For example, the sixth channel of the second frequency band may be a FILS common channel.

Thus, according to the techniques described herein, the access point comprises an IEEE 802.11ai access point, and the wireless network comprises an IEEE 802.11 wireless network. In one example, the IEEE 802.11ai access point comprises a dual-band access point. In another example, the IEEE 802.11ai access point comprises a single-band access point.

The mobile device 120 may be configured to scan the dedicated channel 150 to detect an RNR from the first access point 110 or to detect an RNR from the second access point 130. For example, upon entering a transmission range of the first network 112 and/or the second network 132, the mobile device 120 may scan the dedicated channel 150 (e.g., channel 6) to detect beacons or FILS discovery frames that are broadcasted on the dedicated channel 150 via the access points 110, 130. The mobile device 120 may scan the dedicated channel 150 at particular times that are synchronized to a global time source to reduce power drain associated with scanning operations. For example, if the access points 110, 130 broadcast beacons according to the global time source, the mobile device 120 may reduce an effective amount of scans on the dedicated channel 150 for beacons by synchronizing scanning operations with the global time source. Reducing the effective amount of scans may conserve power at the mobile device 120. Beacons and FILS discovery frames broadcasted from the first access point 110 may include the first neighbor report 114, and beacons and FILS discovery frames broadcasted from the second access point 130 may include the second neighbor report 134.

When the mobile device 120 detects a beacon and/or a FILS discovery frame on the dedicated channel 150, the mobile device may obtain information about a "preferred" access point from the neighbor report 114, 134 in the detected beacon and/or FILS discovery frame. As a non-limiting example, the preferred access point may be an access point provided by a particular wireless service provider of the mobile device 120 or an access point for a particular wireless network associated with the mobile device 120. According to one implementation, the preferred access point is defined by the mobile device 120. According to another implementation, the preferred access point is defined by a service provider of the mobile device 120. To illustrate, in FIG. 1, a home access point 160 may be a preferred access point of the mobile device 120. The home access point 160 may support a "home" network 162 of the mobile device 120, and the first network 112 may be another wireless network (e.g., a wireless network of a coffee shop). Thus, the mobile device 120 may attempt to obtain information about the home access point 160 to establish a connection with the home network 162 of the mobile device 120 (e.g., perform an authentication routine or handshake with the home access point 160). The home access point 160 may operate on the dedicated channel 150 (e.g., broadcast neighbor reports to stations (e.g., the mobile device 120) and other access points within transmission range of the home network 162 via a dedicated channel 150) and a primary operating channel 164. The home access point 160 may not operate on the dedicated channel 150 and may maintain all operations on the primary operating channel 164.

During scanning operations, if the mobile device 120 detects the first neighbor report 114 broadcasted from the first access point 110, the mobile device 120 may obtain information about the second access point 130 from the first neighbor report 114. For example, the mobile device 120 may obtain an operating class of the second access point 130, a primary operating channel of the second access point 130, a TBTT of the second access point 130, and/or a basic service set identification (BSSID) of the second access point 130 from the first neighbor report 114. Based on the obtained information, the mobile device 120 may establish a communication link (e.g., initiate an authentication/association process) with the second access point 130.

After scanning the dedicated channel 150 for a particular time period, the mobile device 120 may generate and transmit (e.g., broadcast) the probe request 124 via the dedicated channel 150 if the mobile device has not detected an RNR from at least one of the access points 110, 130. The probe request 124 may indicate to the access points 110, 130 that the mobile device 120 needs to obtain information (e.g., an RNR) to establish a connection with a particular access point.

Upon receiving the probe request 124, each access point 110, 130 may respond to the probe request 124 (e.g., generate and broadcast a probe response) via the dedicated channel 150. To illustrate, each access point 110, 130 may respond to the probe request 124 (e.g., transmit a probe response that includes an RNR) by operating on the dedicated channel 150 (e.g., channel 6). Alternatively, each access point 110, 130 may maintain a "light" network on the dedicated channel 150. For example, each access point 110, 130 may operate on the first channel (channel 1) or the eleventh channel (channel 11) of the 2.4 GHz frequency band in a 40 Mega-Hertz (MHz) mode to maintain a light network (e.g., a light connection) on the dedicated channel 150 to respond to the probe request 124.

In response to broadcasting the probe request 124, the mobile device 120 may receive a probe response from at least one of the access points 110, 130. For example, the mobile device 120 may receive a probe response including the first neighbor report 114 from the first access point 110, a probe response including the second neighbor report 134 from the second access point 130, or a combination thereof. Based on the obtained information in the neighbor report(s) 114, 134, the mobile device 120 may establish a communication link (e.g., perform an authentication routine or handshake) with the home access point 160. For example, the mobile device 120 may determine the primary operating channel 164 of the home access point 160 based on the obtained information in the neighbor report(s) 114, 134, transmit an authentication frame to the home access point 160 via the primary operating channel 164, receive an acknowledgment frame from the home access point 160 via the primary operating channel 164, etc. The mobile device 120 may select the home access point 160 from a plurality of access points. The preferred access point of the mobile device 120 may correspond to an access point that transmits an RNR (or probe response) that is detected by the mobile device 120.

The initial link setup time to establish a communication link between the mobile device 120 and a preferred access point may be reduced by utilizing the dedicated channel 150 to obtain RNRs. For example, the mobile device 120 may scan and/or probe the dedicated channel 150 to receive RNRs from the access points 110, 130 as opposed to scanning and/or probing multiple channels before detecting an 802.11ai access point. Thus, utilizing the dedicated channel 150 for RNR detection reduces the likelihood of the mobile device 120 scanning a channel that is not actively being used by an 802.11ai access point.

Figure 2:
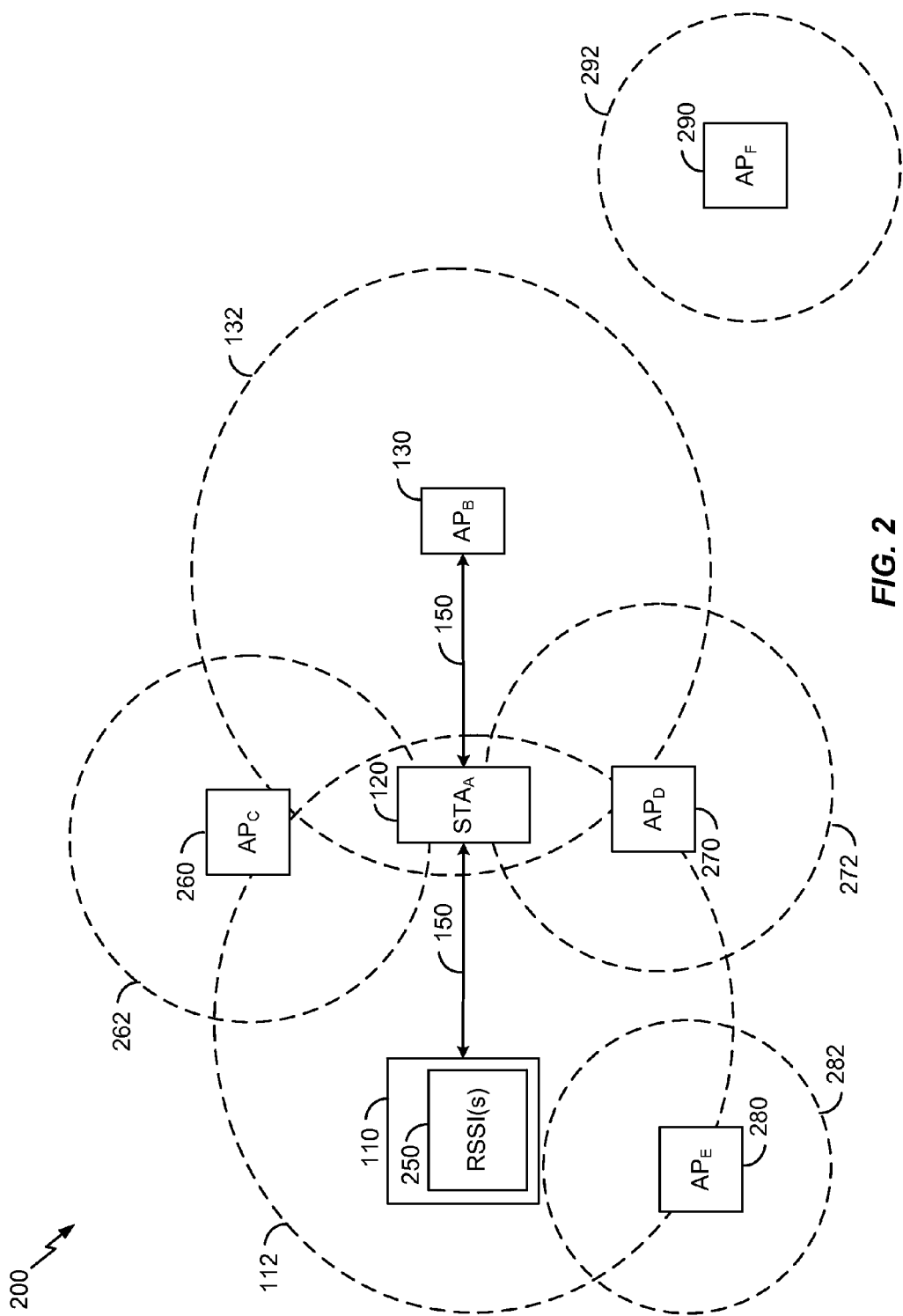
FIG. 2 is a diagram of another system that is operable to enable fast initial link setup via a dedicated channel.

Referring to FIG. 2, another system 200 that is operable to enable fast initial link setup via a dedicated channel is shown. The system 200 includes the first access point 110, the mobile device 120, the second access point 130, a third access point (designated $AP_C$) 260, a fourth access point (designated $AP_D$) 270, a fifth access point (designated $AP_E$) 280, and a sixth access point (designated $AP_F$) 290. It should be noted that although FIG. 2 depicts six access points 110, 130, 260, 270, 280, 290, any number of access points may be present in the system 200. Additionally, it should be noted that although FIG. 2 depicts a single mobile device 120, any number of mobile devices may be present in the system 200. Each of the access points 110, 130, 260, 270, 280, 290 and the mobile device 120 may operate in compliance with one or more IEEE 802.11 standards, such as 802.11ai.

Each of the access points 110, 130, 260, 270, 280, 290 may be a node of a wireless network. For example, each of the access points 110, 130, 260, 270, 280, 290 may be an IEEE 802.11 access point that is associated with a corresponding network (e.g., a wireless network). For example, the first access point 110 may support the first network 112, the second access point 130 may support the second network 132, the third access point 260 may support a third network 262, the fourth access point 270 may support a fourth network 272, the fifth access point 280 may support a fifth network 282, and the sixth access point 290 may support a sixth network 292. Each of the access points 110, 130, 260, 270, 280, 290 may include (e.g., store) a corresponding neighbor report. Each neighbor report may include, or correspond to, an RNR. Each access point's neighbor report may identify one or more neighboring access points and may be included in one or more beacon frames, one or more neighbor reports, or a combination thereof.

During operation, each access point 110, 130, 260, 270, 280, 290 may determine whether to suppress the broadcast of a FILS frame based on the received signal strength of at least one neighboring access point's FILS frame on the dedicated channel 150. As used herein, a FILS frame may correspond to any broadcast from an access point that includes an RNR or any other information used to facilitate an initial link setup between the mobile station 120 and an access point. For example, a FILS frame may include a beacon frame, a FILS discovery frame, a probe response, etc. Each access point 110, 130, 260, 270, 280, 290 may scan the dedicated channel to detect FILS frames from neighboring access points and measure the received signal strength of the detected FILS frames. If the received signal strength of at least one neighboring point's FILS frame on the dedicated channel 150 satisfies a threshold, an access point may suppress transmission of a FILS broadcast to reduce traffic on the dedicated channel 150.

As an illustrative example, prior to broadcasting a FILS frame (e.g., the first neighbor report 114), the first access point 110 may scan (e.g., "listen in on") the dedicated channel 150 for a particular time period to detect one or more broadcasted FILS frames from one or more access points. The first access point 110 may scan the dedicated channel 150 for approximately 5 ms to detect one or more RNRs from one or more access points. Based on the scan, the first access point 110 may determine whether an access point within a close proximity has broadcasted a FILS frame on the dedicated channel 150. In response to a determination that an access point within a relatively close proximity has broadcasted a FILS frame on the dedicated channel 150, the first access point 110 may suppress broadcast transmission of the first neighbor report 114. For example, the third access point 260 may broadcast a first FILS frame via the dedicated channel 150, and the first access point 110 may detect the first FILS frame during scanning operations. The first access point 110 may measure a first received signal strength of the first FILS frame. For example, the first access point 110 may determine a proximity of the third access point 260 based on a received signal strength indicator (RSSI) 250 associated with the first FILS frame. A relatively high RSSI 250 may indicate that the third access point 260 is in close proximity to the first access point 110, and a relatively low RSSI 250 may indicate that the third access point 260 is not in close proximity to the first access point 110.

In response to a determination that the first received signal strength of the first FILS frame satisfies a first threshold (e.g., is greater than or equal to a first threshold signal strength or has a relatively high RSSI 250), the first access point 110 may suppress the broadcast of the first neighbor report 114 via the dedicated channel 150. For example, the first access point 110 may determine that the third access point's 260 coverage area is substantially similar to the coverage area of the first access point 110 when the first received signal strength satisfies the first threshold. However, if the first access point 110 determines that the first FILS frame does not reference each of the neighboring access points in the first neighbor report 114, the first access point 110 may broadcast the first neighbor report 114 via the dedicated channel 150.

The first threshold may correspond to a suppression range (e.g., a maximum range between the first access point 110 and the third access point 260 that results in the first access point 110 suppressing the broadcast of the first neighbor report 114). For example, the suppression range increases as the first threshold decreases. The suppression range may be preprogrammed into each access point 110, 130, 260, 270, 280, 290 according to an industry standard, such as an IEEE 802.11 standard. A short suppression range may improve reliability by increasing the number of broadcasters. However, a short suppression range may also increase overhead (e.g., generate a relatively large amount of redundant traffic on the dedicated channel 150) and increase broadcast contention.

Additionally, the first access point 110 may determine whether three or more access points within a relatively close proximity have broadcast a FILS frame during scanning operations. For example, during a scanning operation of the first access point 110, the third access point 260 may broadcast the first FILS frame via the dedicated channel 150, the fourth access point 270 may broadcast a second FILS frame via the dedicated channel 150, and the fifth access point 280 may broadcast a third FILS frame via the dedicated channel 150. The first access point 110 may detect the first FILS frame, the second FILS frame, and the third FILS frame on the dedicated channel 150. In addition, the first access point 110 may measure the first received signal strength of the first FILS frame, the second received signal strength of the second FILS frame, and the third received signal strength of the third FILS frame. The first access point 110 may determine the proximity of each access point 260-280 based on RSSIs 250 associated with the received FILS frames.

In response to a determination that the each received signal strength satisfies a second threshold (e.g., is greater than or equal to a second threshold signal strength or has a mid-range RSSI 250), the first access point 110 may suppress the broadcast of the first neighbor report 114. For example, the first access point 110 may determine that the coverage areas of the third, fourth, and fifth access points 260-280, collectively, have a relatively high probability of covering the stations in the coverage area of the first access point 110 when each received signal strength satisfies the second threshold. The first access point 110 may be within a triangle formed by the third, fourth, and fifth access points 260-280. Thus, any stations in the coverage area of the first access point 110 would most likely receive at least one of the first FILS frame from the third access point 260, the second FILS frame from the fourth access point 270, or the third FILS frame from the fifth access point 280. For example, the mobile device 120 may have a high probability of receiving at least one of the first FILS frame, the second FILS frame, or the third FILS frame. However, if the first access point 110 determines that the neighbor reports in the FILS frames from the access points 260-280 do not list each access point in the first neighbor report 114, the first access point 110 may broadcast the first neighbor report 114 via the dedicated channel 150.

The first access point 110 may reduce overhead (e.g., congestion) on the dedicated channel 150 by suppressing the broadcast of the first neighbor report 114 when the received signal strength of one or more neighboring access point's FILS frames on the dedicated channel 150 satisfies a threshold. Implementing the coordination scheme described above may enable FILS frames to be spread in time and coverage area. It will be appreciated that the coordination scheme does not require any messaging between access points because the access points may scan the dedicated channel 150 (e.g., the common channel shared by each access point) to determine received signal strengths of FILS frames.

Figure 3:
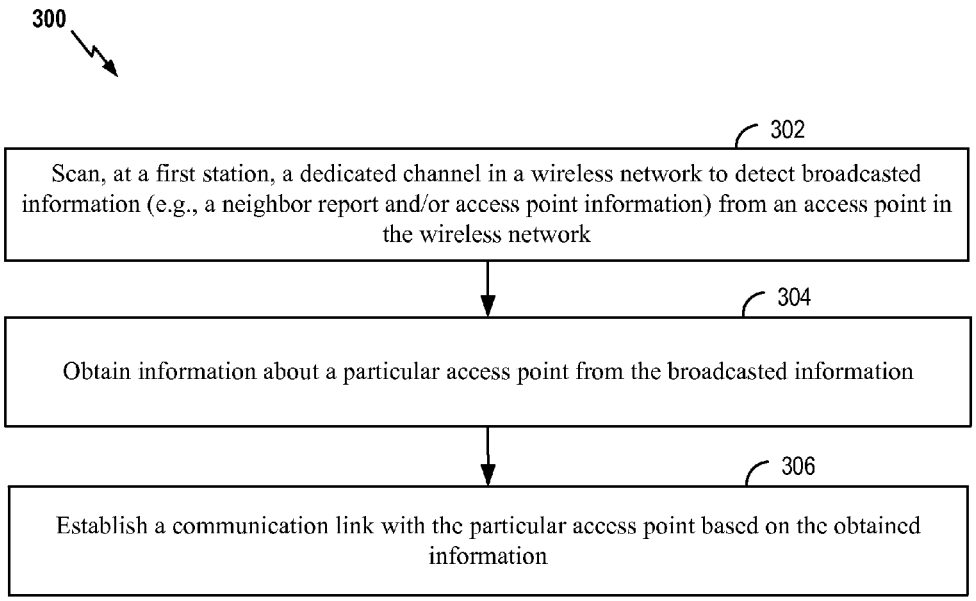
FIG. 3 is a flow diagram of an illustrative method for enabling fast initial link setup via a dedicated channel.

Referring to FIG. 3, a method 300 for enabling fast initial link setup via a dedicated channel is described. The method 300 may be performed using the mobile device 120 of FIGS. 1-2.

The method 300 includes scanning, at a first station, a dedicated channel in a wireless network to detect information (e.g., a neighbor report and/or access point capability information) from an access point in the wireless network, at 302. For example, referring to FIG. 1, the mobile device 120 may scan the dedicated channel 150 to detect an RNR from the first access point 110 or to detect an RNR from the second access point 130. For example, upon entering transmission range of the first network 112 and/or the second network 132, the mobile device 120 may scan the dedicated channel 150 (e.g., channel 6) to detect beacons or FILS discovery frames that are broadcasted on the dedicated channel 150 via the access points 110, 130. Beacons or FILS discovery frames broadcasted from the first access point 110 may include the first neighbor report 114, and beacons and FILS discovery frames broadcasted from the second access point 130 may include the second neighbor report 134.

After scanning the dedicated channel 150 for a particular time period, the mobile device 120 may generate and transmit (e.g., broadcast) the probe request 124 via the dedicated channel 150 if the mobile device has not detected an RNR from at least one of the access points 110, 130. The probe request 124 may indicate to the access points 110, 130 that the mobile device 120 needs to obtain information (e.g., an RNR) to establish a connection with a particular access point. In response to broadcasting the probe request 124, the mobile device 120 may receive a probe response from at least one of the access points 110, 130. For example, the mobile device 120 may receive a probe response including the first neighbor report 114 from the first access point 110, a probe response including the second neighbor report 134 from the second access point 130, or a combination thereof.

Information about a particular access point may be obtained from the broadcasted information, at 304. For example, referring to FIG. 1, the mobile device 120 may detect the first neighbor report 114 broadcasted from the first access point 110. The mobile device 120 may obtain information about the second access point 130 from the first neighbor report 114. For example, the mobile device 120 may obtain an operating class of the second access point 130, a primary operating channel of the second access point 130, a TBTT of the second access point 130, and/or a BSSID of the second access point 130 from the first neighbor report 114.

A communication link with the particular access point may be established based on the obtained information, 306. For example, referring to FIG. 1, the mobile device 120 may establish a communication link (e.g., initiate an authentication/association process) with a preferred access point based on the obtained information from the first neighbor report 114. To illustrate, the mobile device 120 may determine the primary operating channel 164 of the home access point 160 (e.g., the preferred access point) based on the obtained information in the neighbor report(s) 114, 134, transmit an authentication frame to the home access point 160 on the primary operating channel 164, and receive an acknowledgment frame from the home access point 160 on the primary operating channel 164, etc. The preferred access point may be an access point of a network dedicated to the mobile device 120 (e.g., a "home" network) or a network selected by a user of the mobile device 120.

The method 300 of FIG. 3 may decrease the initial link setup time to establish a communication link between the mobile device 120 and a preferred access point may be reduced by utilizing the dedicated channel 150 to obtain RNRs. For example, the mobile device 120 may scan and/or probe the dedicated channel 150 to receive RNRs from the access points 110, 130 as opposed to scanning and/or probing multiple channels before detecting an 802.11ai access point. Thus, utilizing the dedicated channel 150 for RNR detection may reduce the likelihood of the mobile device 120 scanning a channel that is not actively being used by an 802.11ai access point.

Figure 4:
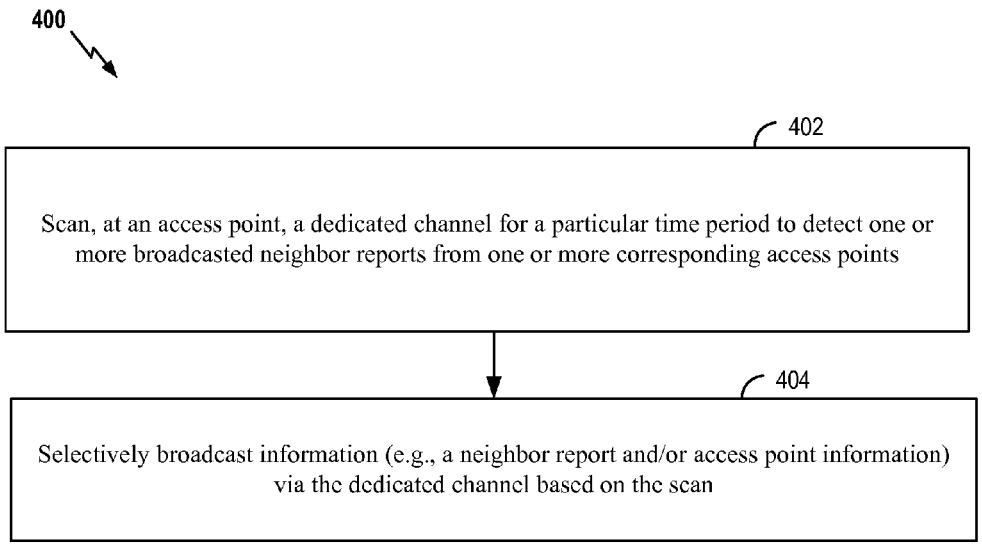
FIG. 4 is a flow diagram of another illustrative method for enabling fast initial setup via dedicated channel.

Referring to FIG. 4, another method 400 for enabling fast initial link setup via a dedicated channel is described. The method 400 may be performed using the first access point 110 of FIGS. 1-2, the second access point 130 of FIGS. 1-2, the third access point 260 of FIG. 2, the fourth access point 270 of FIG. 2, the fifth access point 280 of FIG. 2, the sixth access point 290 of FIG. 2, or a combination thereof.

The method 400 includes scanning, at an access point, a dedicated channel for a particular time period to detect one or more broadcasted neighbor reports from one or more corresponding access points, at 402. For example, referring to FIG. 2, prior to broadcasting the first neighbor report 114, the first access point 110 may scan the dedicated channel 150 for a particular time period to detect one or more broadcasted FILS frames (including reduced neighbor reports) from one or more corresponding access points. The first access point 110 may scan the dedicated channel 150 for approximately 5 ms to detect one or more RNRs from one or more corresponding access points.

Information (e.g., a neighbor report and/or access point capability information) may be selectively broadcast via the dedicated channel based on the scan, at 404. For example, referring to FIG. 2, the first access point 110 may determine whether an access point within a close proximity has broadcasted a FILS frame on the dedicated channel 150. In response to a determination that an access point within a relatively close proximity has broadcasted a FILS frame on the dedicated channel 150, the first access point 110 may suppress broadcast transmission of the first neighbor report 114.

For example, the first access point 110 may detect and measure the first received signal strength of the first FILS frame from the third access point 260 during scanning operations. A relatively high RSSI 250 indicates that the third access point 260 is in close proximity to the first access point 110. In response to a determination that the first received signal strength of the first FILS frame satisfies a first threshold (e.g., is greater than or equal to a first threshold signal strength or has a relatively high RSSI 250), the first access point 110 may suppress the broadcast of the first neighbor report 114 via the dedicated channel 150.

Additionally, the first access point 110 may determine whether three or more access points within a relatively close proximity have broadcast a FILS frame during scanning operations. For example, the first access point 110 may detect the second FILS frame from the fourth access point 270 and the third FILS frame from the fifth access point 280 on the dedicated channel 150. In addition, the first access point 110 may measure the second received signal strength of the second FILS frame and the third received signal strength of the third FILS frame. In response to a determination that the each received signal strength satisfies a second threshold (e.g., is greater than or equal to a second threshold signal strength or has a mid-range RSSI 250), the first access point 110 may suppress the broadcast of the first neighbor report 114.

However, in response to a determination that there are not any access points that have broadcasted a FILS frame on the dedicated channel 150 with a received signal strength satisfying the first threshold and there are not three or more access points that have broadcasted FILS frames on the dedicated channel 150 with a received strength satisfying the second threshold, the first access point 110 broadcasts the first neighbor report 114 on the dedicated channel 150. In addition, if the first access point 110 determines that the neighbor reports in the FILS frames from the neighboring access points do not list each access point in the first neighbor report 114, the first access point 110 may broadcast the first neighbor report 114 via the dedicated channel 150.

The method 400 of FIG. 4 may reduce overhead (e.g., congestion) on the dedicated channel 150 by suppressing the broadcast of the first neighbor report 114 when the received signal strength of one or more neighboring access point's FILS frames on the dedicated channel 150 satisfies a threshold. Implementing the coordination RNR broadcast scheme described above may enable FILS frames to be spread in time and coverage area. It will be appreciated that the coordination scheme does not require any messaging between access points because the access points may scan the dedicated channel 150 (e.g., the common channel shared by each access point) to determine received signal strengths of FILS frames.

Figure 5:
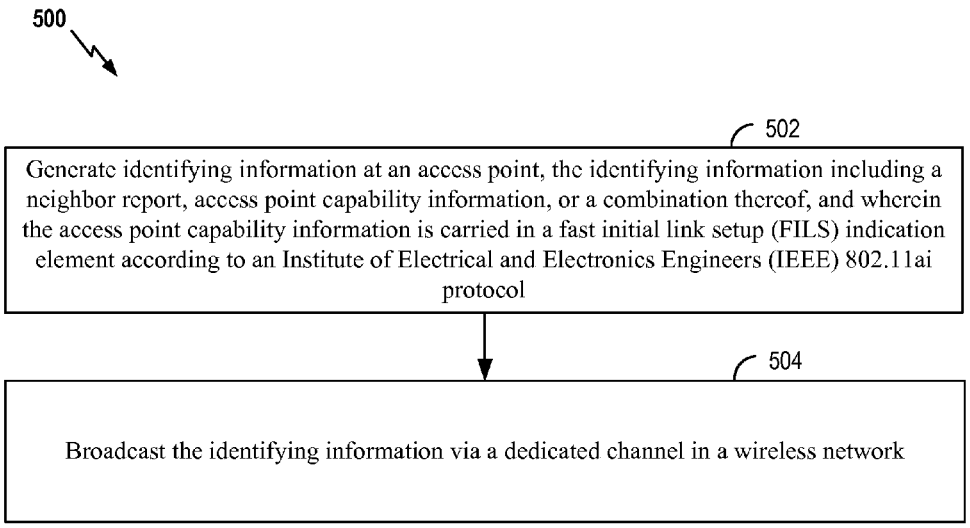
FIG. 5 is a flow diagram of another illustrative method for enabling fast initial link setup via a dedicated channel.

Referring to FIG. 5, another method 500 for enabling fast initial link setup via a dedicated channel is described. The method 500 may be performed using the first access point 110 of FIGS. 1-2, the second access point 130 of FIGS. 1-2, the third access point 260 of FIG. 2, the fourth access point 270 of FIG. 2, the fifth access point 280 of FIG. 2, the sixth access point 290 of FIG. 2, or a combination thereof.

The method 500 includes generating identifying information at an access point, at 502. For example, referring to FIG. 1, the first access point 114 may generate identifying information. The identifying information may include a neighbor report (e.g., a reduced neighbor report according to the IEEE 802.11ai protocol), access point capability information, or a combination thereof. The access point capability information may be carried in a FILS indication element according to the IEEE 802.11ai protocol. In one example, the access point capability information includes access point security information associated with the access point and higher layer capability information indicating higher layer capabilities of the access point.

The identifying information may be broadcasted via a dedicated channel in a wireless network, at 504. For example, referring to FIG. 1, the first access point 110 may broadcast the information via the dedicated channel 150. The dedicated channel according to the method 500 may include a channel (e.g., a particular channel) in a set of non-overlapping channels. For example, the dedicated channel may include a common channel that is shared by multiple access points in the wireless network to broadcast neighbor reports.

According to the method 500, the access point may include an IEEE 802.11ai access point and the wireless network may include an IEEE 802.11 wireless network. In one example, the IEEE 802.11ai access point includes a dual-band access point. In another example, the IEEE 802.11ai access point includes a single-band access point. The neighbor report may include a list of nearby access points in the wireless network. In one example, each access point in the list of nearby access points is operating on a distinct channel. In one example, the neighbor report is included in a one of a beacon frame broadcasted from the access point via the dedicated channel, a FILS discovery frame broadcasted from the access point via the dedicated channel, or a probe response from the access point.

The method 500 may also include scanning the dedicated channel for a particular time period to detect one or more broadcasted neighbor reports from one or more corresponding access points prior to broadcasting the identifying information. The access point determines whether to suppress the broadcast of the identifying information based on corresponding signal strengths of the one or more broadcasted neighbor reports. For example, a broadcast of a particular neighbor report from the access point may be suppressed when a received signal strength of another neighbor report broadcasted from another access point satisfies a first threshold. As another example, a broadcast of a particular neighbor report from the access point may be suppressed when signal strengths of corresponding neighbor reports broadcasted from other access points satisfy a second threshold. In one example, the signal strengths of corresponding neighbor reports correspond to at least three signal strengths of three corresponding neighbor reports. The method 500 may also include broadcasting a second neighbor report and second access point capability information on a primary operating channel of the access point.

Figure 6:
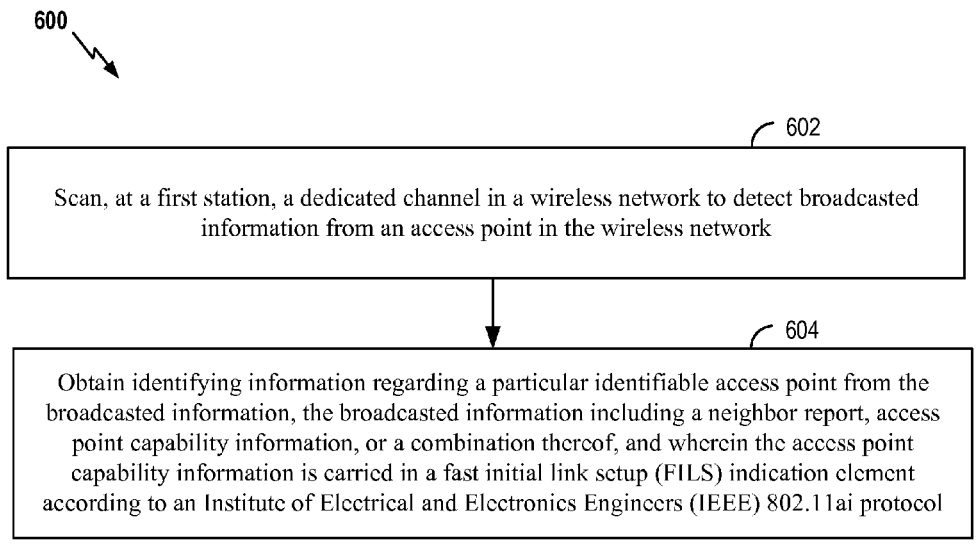
FIG. 6 is a flow diagram of another illustrative method for enabling fast initial setup via dedicated channel.

Referring to FIG. 6, another method 600 for enabling fast initial link setup via a dedicated channel is described. The method 600 may be performed using the mobile device 120 of FIGS. 1-2.

The method 600 includes scanning, at a first station, a dedicated channel in a wireless network to detect broadcasted information from an access point in the wireless network, at 602. For example, referring to FIG. 1, the first station 120 may scan the dedicated channel 150 to detect broadcasted information from one of the access points 110, 130.

Identifying information regarding a particular identifiable access point may be obtained from the broadcasted information, at 604. For example, referring to FIG. 1, the first station 120 may obtain identifying information regarding a particular identifiable access point in the wireless network based on the broadcasted information. The broadcasted information may include a neighbor report (e.g., a reduced neighbor report according to an IEEE 802.11ai protocol), access point capability information, or a combination thereof. The access point capability information may be carried in a FILS indication element according to the IEEE 802.11ai protocol. The access point capability information may include access point security information associated with a particular identifiable access point and higher layer capability information indicating higher layer capabilities of the particular identifiable access point. The neighbor report may be included in one of a beacon frame broadcasted from the access point via the dedicated channel, a FILS discovery frame broadcasted from the access point via the dedicated channel, or a probe response from the access point.

According to the method 600, the dedicated may include a channel (e.g., a particular channel) in a set of non-overlapping channels. In one example, the dedicated channel comprises a common channel that is shared by multiple access points in the wireless network to broadcast neighbor reports. The access point may include an IEEE 802.11ai access point and the wireless network may include an IEEE 802.11 wireless network. In one example, the IEEE 802.11ai access point includes a dual-band access point. In another example, the IEEE 802.11ai access point includes a single-band access point. The neighbor report according to the method 600 may include a list of nearby access points in the wireless network. Each access point in the list of nearby access points may operate on a distinct channel.

The method 600 may also include establishing a communication link with the particular identifiable access point based on the broadcasted information. For example, the method 600 may include determining a primary operating channel of the particular identifiable access point based on the broadcasted information. The method 600 may also include transmitting an authentication frame to the particular identifiable access point via the primary operating channel. The method 600 may also include receiving an acknowledgment frame from the particular identifiable access point.

The method 600 may also include broadcasting, at the first station, a probe request via the dedicated channel after a particular time period has elapsed without detecting the broadcasted information. The method 600 may also include receiving a probe response from the access point via the dedicated channel in response to broadcasting the probe request. The probe response may include the broadcasted information according to the method 600.

The method 600 of FIG. 6 may decrease the initial link setup time to establish a communication link between the mobile device 120 and a preferred access point may be reduced by utilizing the dedicated channel 150 to obtain neighbor reports and access point capability information. For example, the mobile device 120 may scan and/or probe the dedicated channel 150 to neighbor reports and access point capability information from the access points 110, 130 as opposed to scanning and/or probing multiple channels before detecting an 802.11ai access point. Thus, utilizing the dedicated channel 150 for neighbor report detection may reduce the likelihood of the mobile device 120 scanning a channel that is not actively being used by an 802.11ai access point.

Figure 7:
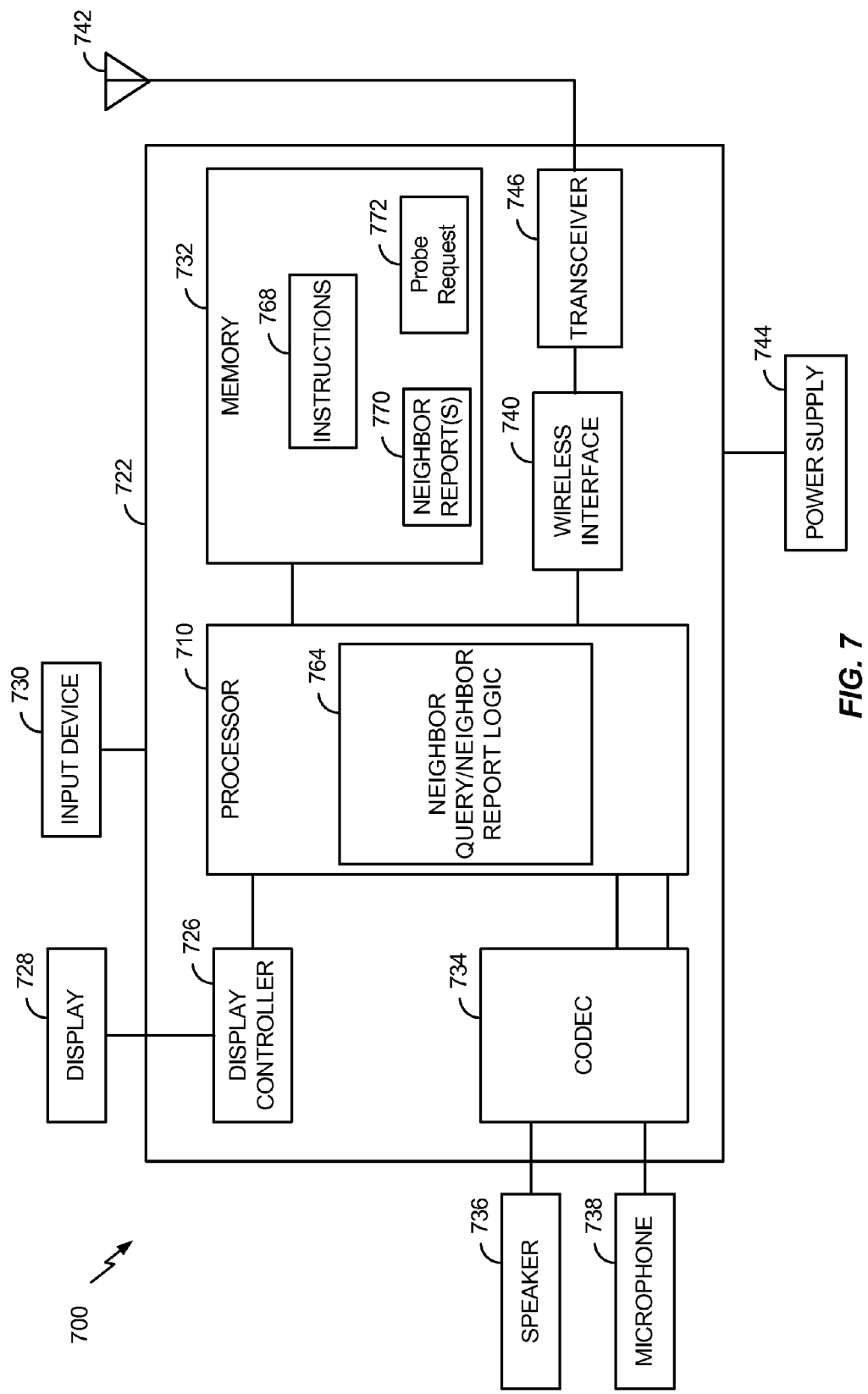
FIG. 7 is a diagram of a wireless device that is operable to support various techniques of one or more methods, systems, apparatuses, and/or computer-readable media disclosed herein.

Referring to FIG. 7, a block diagram of a wireless communication device is depicted and generally designated 700. The device 700 includes a processor 710, such as a digital signal processor, coupled to a memory 732. In one example, the device 700, or components thereof, may correspond to the access points 110, 130 of FIGS. 1-2, the access points 260, 270, 280, 290 of FIG. 2, or components thereof. In another example, the device 700 may correspond to the mobile device 120 of FIGS. 1-2 or components thereof.

The processor 710 may be configured to execute software (e.g., a program of one or more instructions 768) stored in the memory 732. Additionally or alternatively, the processor 710 may be configured to implement one or more instructions stored in a memory of a wireless interface 740 (e.g., an IEEE 802.11 wireless interface). In one example (e.g., when the wireless device 700 corresponds to an access point), the processor 710 may be configured to operate in accordance with the method 400 of FIG. 4 and/or the method 500 of FIG. 5. For example, the processor 710 may include neighbor query/neighbor report logic 764 to execute the method 400 of FIG. 4 and/or the method 500 of FIG. 5.

In another example (e.g., when the wireless device 700 corresponds to the mobile device 120), the processor 710 may be configured to operate in accordance with the method 300 of FIG. 3 and/or the method 600 of FIG. 6. For example, the processor 710 may include neighbor query/neighbor report logic 764 to execute the method 300 of FIG. 3 and/or the method 600 of FIG. 6. The processor 710 may also be configured to receive, determine, and/or store one or more neighbor reports 770 and/or one or more probe requests 772. For example, the one or more neighbor reports 770 and/or one or more probe requests 772 may be stored in the memory 732. One or more neighbor reports 770 may include the first neighbor report 114 and/or the second neighbor report 134, as illustrative, non-limiting examples. The one or more probe requests 772 may include a probe request generated by a mobile device, such as the mobile device 120 of FIGS. 1-2.

The wireless interface 740 may be coupled to the processor 710 and to an antenna 742. For example, the wireless interface 740 may be coupled to the antenna 742 via a transceiver 746, such that wireless data received via the antenna 742 may be provided to the processor 710.

When the wireless device 700 corresponds to the mobile device 120, a coder/decoder (CODEC) 734 can also be coupled to the processor 710. A speaker 736 and a microphone 738 can be coupled to the CODEC 734. A display controller 726 can be coupled to the processor 710 and to a display device 728. The processor 710, the display controller 726, the memory 732, the CODEC 734, and the wireless interface 740, are included in a system-in-package or system-on-chip device 722. An input device 730 and a power supply 744 are coupled to the system-on-chip device 722. Moreover, as illustrated in FIG. 7, the display device 728, the input device 730, the speaker 736, the microphone 738, the antenna 742, and the power supply 744 are external to the system-on-chip device 722. However, each of the display device 728, the input device 730, the speaker 736, the microphone 738, the antenna 742, and the power supply 744 can be coupled to one or more components of the system-on-chip device 722, such as one or more interfaces or controllers.

In conjunction with the described techniques, an apparatus includes means for scanning a dedicated channel in a wireless network to detect broadcasted information from an access point in the wireless network. For example, the means for scanning may include the wireless interface 740 of FIG. 7, the transceiver 746 of FIG. 7, the processor 710 programmed to execute the instructions 768 of FIG. 7, one or more other devices, circuits, modules, or instructions to scan the dedicated channel, or a combination thereof.

The apparatus also includes means for obtaining identifying information regarding a particular access point from the broadcasted information. For example, the means for obtaining the identifying information may include the wireless interface 740 of FIG. 7, the processor 710 programmed to execute the instructions 768 of FIG. 7, one or more other devices, circuits, modules, or instructions to obtain information of the particular access point, or a combination thereof. The broadcasted information includes a neighbor report (e.g., a reduced neighbor report), access point capability information (e.g., access point security information associated with the particular identifiable access point and higher layer capability information indicating higher layer capabilities of the particular identifiable access point), or a combination thereof. The access point capability information is carried in a FILS indication element according to an IEEE 802.11ai protocol.

In conjunction with the described techniques, an apparatus includes means for determining a signal strength of at least one broadcasted neighbor report on a dedicated channel in a wireless network. For example, the means for determining the signal strength may include the processor 710 programmed to executed the instructions 768 of FIG. 7, one or more other devices, circuits, modules, or instructions to determine the signal strength of at least one broadcasted reduced neighbor report on the dedicated channel, or a combination thereof.

The apparatus also includes means for broadcasting identifying information via the dedicated channel in response to a determination that the signal strength fails to satisfy a threshold. For example, the means for broadcasting may include the wireless interface 740 of FIG. 5, the transceiver 746 of FIG. 7, the antenna 742 of FIG. 7, the processor 710 programmed to executed the instructions 768 of FIG. 7, one or more other devices, circuits, modules, or instructions to broadcast the reduced neighbor report, or a combination thereof. The identifying information includes a neighbor report (e.g., a reduced neighbor report), access point capability information (e.g., access point security information associated with the access point and higher layer capability information indicating higher layer capabilities of the access point), or a combination thereof. The access point capability information is carried in a FILS indication element according to an IEEE 802.11ai protocol.

Those of skill in the art would further appreciate that the various illustrative logical blocks, configurations, modules, circuits, and algorithm steps described in connection with the techniques disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the techniques disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed techniques is provided to enable a person skilled in the art to make or use the disclosed techniques. Various modifications to these techniques will be readily apparent to those skilled in the art, and the principles defined herein may be applied to other techniques without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   generating identifying information at an access point, the identifying information including at least one of a neighbor report or access point capability information, wherein the access point capability information is carried in a fast initial link setup (FILS) indication element according to an Institute of Electrical and Electronics Engineers (IEEE) 802.11ai protocol; and
   broadcasting the identifying information via a dedicated channel in a wireless network, the dedicated channel comprising a common channel that is shared by multiple access points in the wireless network to broadcast neighbor reports.

2. The method of claim 1, wherein the neighbor report includes a reduced neighbor report according to the IEEE 802.11ai protocol.

3. The method of claim 1, wherein the access point capability information includes access point security information associated with the access point and higher layer capability information indicating higher layer capabilities of the access point.

4. The method of claim 1, wherein the dedicated channel comprises a particular channel in a set of non-overlapping channels.

5. The method of claim 1, wherein the access point comprises an IEEE 802.11 ai access point, and wherein the wireless network comprises an IEEE 802.11 wireless network.

6. The method of claim 5, wherein the IEEE 802.11ai access point comprises a dual-band access point.

7. The method of claim 5, wherein the IEEE 802.11ai access point comprises a single-band access point.

8. The method of claim 1, wherein the neighbor report includes a list of nearby access points in the wireless network.

9. The method of claim 8, wherein each access point in the list of nearby access points is operating on a distinct channel.

10. The method of claim 1, wherein the neighbor report is included in one of a beacon frame broadcasted from the access point via the dedicated channel, a FILS discovery frame broadcasted from the access point via the dedicated channel, or a probe response from the access point.

11. The method of claim 1, further comprising:
   scanning the dedicated channel for a particular time period to detect one or more broadcasted neighbor reports from one or more corresponding access points prior to the broadcasting the identifying information;
   wherein the access point determines whether to suppress the broadcast of the identifying information based on corresponding signal strengths of the one or more broadcasted neighbor reports.

12. The method of claim 1, further comprising broadcasting a second neighbor report and a second access point capability information on a primary operating channel of the access point.

13. The method of claim 1, wherein a broadcast of a particular neighbor report from the access point is suppressed when a received signal strength of another neighbor report broadcasted from another access point satisfies a first threshold.

14. The method of claim 1, wherein a broadcast of a particular neighbor report from the access point is suppressed when signal strengths of corresponding neighbor reports broadcasted from other access points satisfy a second threshold.

15. The method of claim 14, wherein the signal strengths of corresponding neighbor reports correspond to at least three signal strengths of three corresponding neighbor reports.

16. An apparatus comprising:
   a processor; and a memory coupled to the processor, wherein the memory stores instructions that are executable by the processor to perform operations comprising:

generating identifying information at an access point, the identifying information including at least one of a neighbor report or access point capability information, wherein the access point capability information is carried in a fast initial link setup (FILS) indication element according to an Institute of Electrical and Electronics Engineers (IEEE) 802.11 ai protocol; and broadcasting the identifying information via a dedicated channel in a wireless network, the dedicated channel comprising a common channel that is shared by multiple access points in the wireless network to broadcast neighbor reports.

17. The apparatus of claim 16, wherein the neighbor report includes a reduced neighbor report according to the IEEE 802.11 ai protocol.

18. The apparatus of claim 16, wherein the access point capability information includes access point security information associated with the access point and higher layer capability information indicating higher layer capabilities of the access point.

19. The apparatus of claim 16, wherein the neighbor report is included in one of a beacon frame broadcasted from the access point via the dedicated channel, a FILS discovery frame broadcasted from the access point via the dedicated channel, or a probe response from the access point.

20. The apparatus of claim 16, wherein the operations further comprise:

scanning the dedicated channel for a particular time period to detect one or more broadcasted neighbor reports from one or more corresponding access points prior to the broadcasting the identifying information;

wherein the access point determines whether to suppress the broadcast of the identifying information based on corresponding signal strengths of the one or more broadcasted neighbor reports.

21. A non-transitory computer-readable medium comprising instructions that, when executed by a processor, cause the processor to:

generate identifying information at an access point, the identifying information including at least one of a neighbor report or access point capability information, wherein the access point capability information is carried in a fast initial link setup (FILS) indication element according to an Institute of Electrical and Electronics Engineers (IEEE) 802.11 ai protocol; and initiate a broadcast of the identifying information via a dedicated channel in a wireless network, the dedicated channel comprising a common channel that is shared by multiple access points in the wireless network to broadcast neighbor reports.

22. The non-transitory computer-readable medium of claim 21, wherein the neighbor report includes a reduced neighbor report according to the IEEE 802.11 ai protocol.

23. An apparatus comprising:

means for determining a signal strength of at least one broadcasted neighbor report on a dedicated channel in a wireless network, the dedicated channel comprising a common channel that is shared by multiple access points in the wireless network to broadcast neighbor reports; and means for broadcasting identifying information via the dedicated channel in response to a determination that the signal strength fails to satisfy a threshold, the identifying information including at least one of a neighbor report or access point capability information, wherein the access point capability information is carried in a fast initial link setup (FILS) indication element according to an Institute of Electrical and Electronics Engineers (IEEE) 802.11 ai protocol.

24. The apparatus of claim 23, wherein the neighbor report includes a reduced neighbor report according to the IEEE 802.11ai protocol.

25. The apparatus of claim 23, wherein the dedicated channel comprises a particular channel in a set of non-overlapping channels.

* * * * *